UNITED STATES PATENT OFFICE.

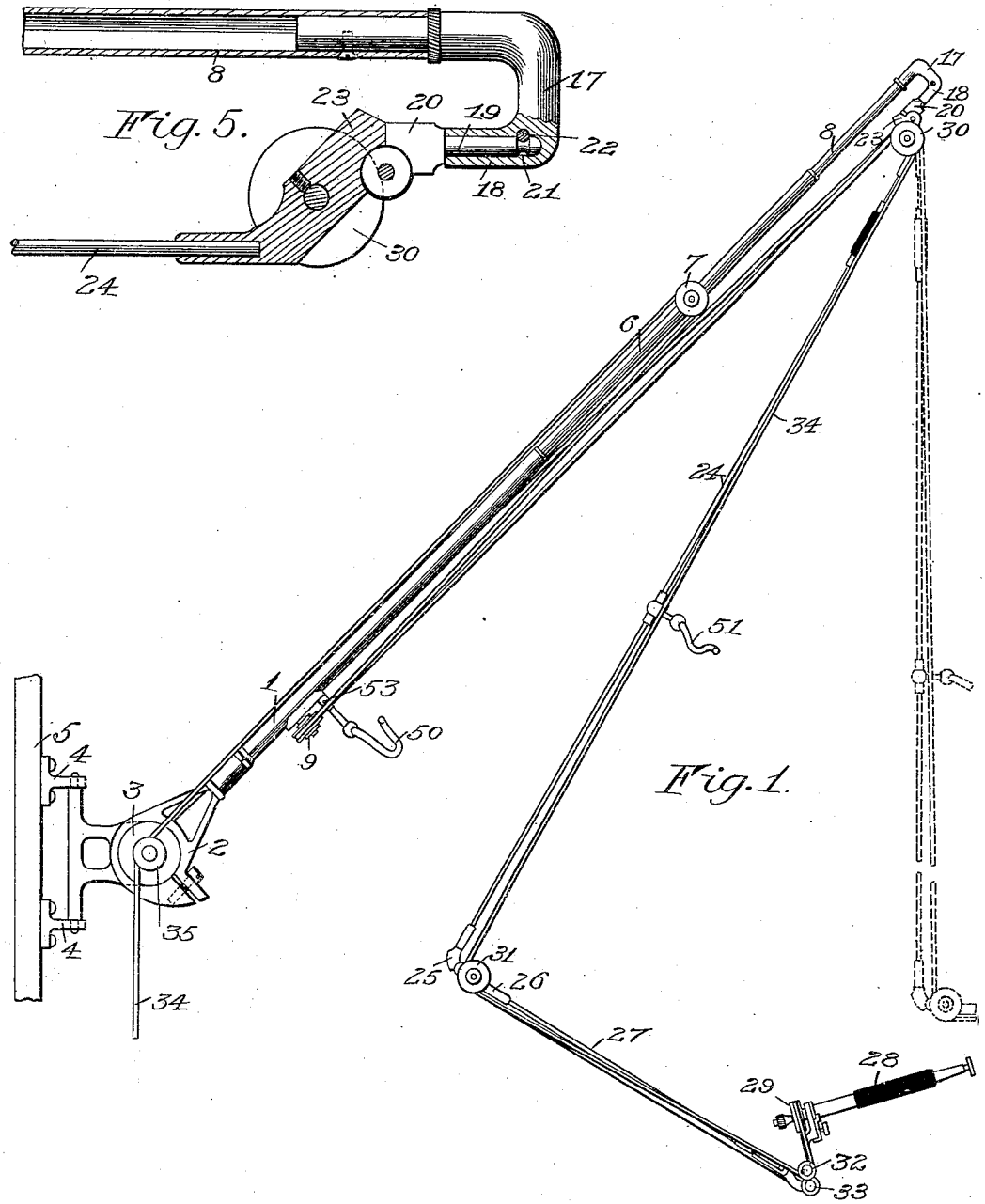

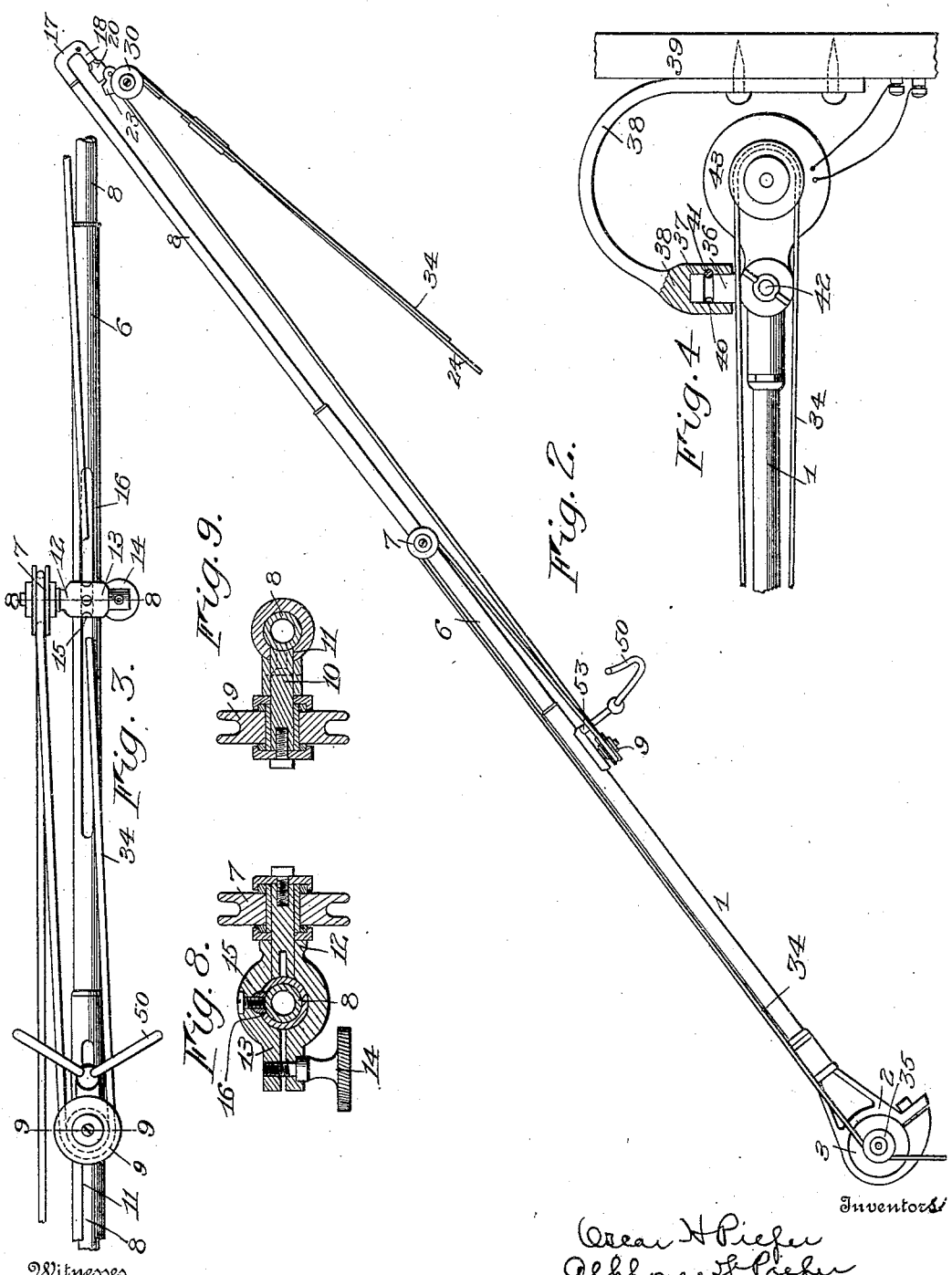

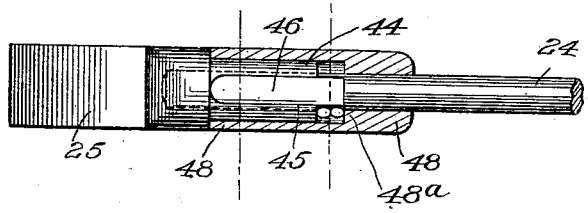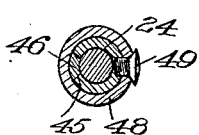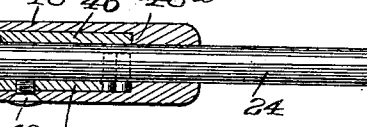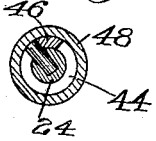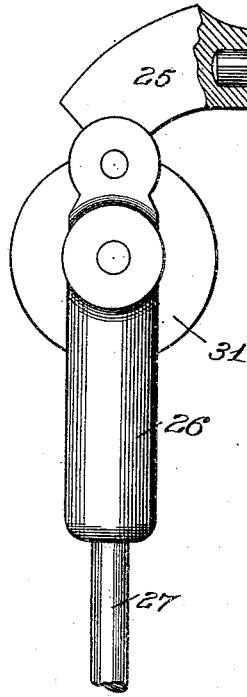

OSCAR H. PIEPER AND ALPHONSE F. PIEPER, OF ROCHESTER, NEW YORK.

DENTAL ENGINE.

No. 930,082.  Specification of Letters Patent.  Patented Aug. 3, 1909.

Application filed February 7, 1906. Serial No. 299,994.

*To all whom it may concern:*

Be it known that we, OSCAR H. PIEPER and ALPHONSE F. PIEPER, of the city of Rochester, in the county of Monroe and State of New York, have invented certain new and useful Improvements in Dental Engines; and we do hereby declare the following to be a full, clear, and exact description of the same, reference being had to the accompanying drawings, forming a part of this specification, and to the reference-numerals marked thereon.

Our present invention relates to improvements in dental engines, and it has for its object to provide an improved device of this kind whereby the hand piece carrying the tools employed by the operator in grinding, drilling, polishing and various other operations, is capable of a wide range of adjustment and movement with the slightest effort and strain on the hand of the operator, so that the various dental operations may be performed with delicacy and in the most convenient manner.

Our invention also has as an object to provide certain improvements in the details of the device that improve its general construction and operation.

To these and other ends the invention consists in certain improvements and combinations of parts, all as will be hereinafter more fully explained, the novel features being pointed out in the claims at the end of the specification.

In the drawings: Figure 1 represents a side elevation of a dental engine or bracket constructed in accordance with our present invention; Fig. 2 is a view similar to Fig. 1, the extensible section occupying an extended position for lengthening the main supporting arm; Fig. 3 is a detail view of so much of the main supporting arm as shows the extensible feature. Fig. 4 illustrates the invention applied to dental brackets having the operating motor supported on the main arm thereof. Fig. 5 is a detail view of the hinge and swivel connection between the main supporting arm and the freely movable or pendent arm of the engine. Fig. 6 is a sectional view of the swivel connection between the pendent arm and the horizontal arm which connects it to the hand piece. Fig. 7 represents a section on the line 7—7 of Fig. 6. Fig. 8 represents a transverse section of the belt tensioning pulley on the line 8—8 of Fig. 3. Fig. 9 represents a section on the line 9—9 of Fig. 3. Fig. 10 is a detail view of the hinge members for connecting the pendent and horizontal arms, the stop device for the arm 24 being shown in section. Fig. 11 represents a section on the line 11 of Fig. 6, and Fig. 12 is a perspective view showing the outer casing of the stop device removed.

Similar reference numerals in the several figures indicate similar parts.

In dental engines and other devices of the same general class, it is particularly desirable that the relation between the hand piece supporting the operating tool and the motor shall be such that the most delicate movements of the hand piece may take place without moving the heavier parts of the bracket in order that the hand piece will respond in movement to the slightest efforts of the operator, enabling the various dental operations to be performed with delicacy and precision and without producing tension or strain on the hand of the operator, and the present embodiment of our invention is shown applied to such a dental engine embodying a main supporting arm 1 having an adjustable clamp 2 for rigidly securing it at the desired angle of inclination by means of its coöperative relation with the bearing 3, the latter being free to swing in a horizontal plane by means of its pivotal connection with the brackets 4 firmly secured to a wall or other suitable means of support 5. This main supporting arm is made up of two or more telescopic sections or members which are capable of relative longitudinal movement for varying the length thereof, and the arm shown in the present instance is composed of a tubular lower section 6 having a belt pulley 7 fixed thereon and an upper extensible section 8 fitted to operate longitudinally within the tubular section. This extensible section has a belt pulley 9 fixed to that end thereof which is inclosed within the tubular lower section, the said pulley having a bearing or supporting pin 10 extending through a longitudinal slot 11 in the tubular section 6, and screwed or otherwise secured to the inner extensible section 8. The pulley 7 is journaled on a bracket 12 embodying a split sleeve 13 adapted to be clamped in proper position on the outside of the tubular section by means of a screw 14, a key 15 on this bracket resting in the longitudinal slot 16 formed in the tubular section, and serving to permit relative longitudinal movements of the sections, and to prevent rotation of the bracket on its supporting section of the arm.

The upper end of the extensible section is provided with a downwardly turned elbow 17 having a bearing portion 18 thereof extending in a direction substantially parallel to the main supporting arm, and serving as a journal bearing for a rotatable pin 19 carried on a hinge member 20, the pin 19 having a circumferential groove 21 thereon to receive a retaining pin 22 which serves to permit a rotary movement of the hinge member 20 and yet prevents its disconnection from the main supporting arm. The hinge member 20 coöperates with the corresponding hinge member 23 on the pendent arm 24, the latter being arranged to hang vertically when in normal position from the upper end of the main supporting arm of the engine. The lower end of this vertically-hanging or pendent arm 24 is connected by hinge members 25 and 26 to an arm 27 which is intended to occupy normally a substantially horizontal position and serves to connect the pendent arm with the hand piece 28, the latter being of any desired type having a pulley 29 for driving the operating tool held thereby. The vertically-hanging arm 24 is provided with a pair of pulleys 30 at a point adjacent to its hinge connection with the main supporting arm, while the arm 27 is provided with a pair of pulleys 31 at a point adjacent to its hinge connection with the arm 24, the hand piece in turn having a hinge connection with the free end of the arm 27 and provided with a pair of guiding pulleys 32 and 33 in line with the pulley 29 of the hand piece.

In that form of our invention shown in Figs. 1, 2 and 3 the operating motor is located at a point removed from the bracket or engine, and it is connected to the hand piece by means of a belt 34 which passes over pulleys 35 arranged adjacent to the bearing 3, and is extended up the main supporting arm and passes over the pulley 7 thereon, and thence over the pulley 9, and from the pulley 9 it is extended over the pulleys 30, 31 and 32, around the pulley 29 on the hand piece, over the pulley 33, and, by means of the pulleys 31, 30 and 35, it returns to the operating motor. However, the motor, if so preferred, may be carried on the main arm of the engine, as shown in Fig. 4, this arm in this form of the invention having a vertical journal 36 formed to enter a corresponding vertical bearing 37 in a rigid supporting bracket 38, the latter being fixed in a suitable way to a wall or suitable support 39. This journal 36 has a circumferential groove 40 to receive a retaining pin 41 for permitting it to turn in a horizontal plane, and to hold it from disengagement with its bearing in the bracket. This journal 36 is also provided with a bearing 42 having a clamping device which serves to support the main bearing arm 1 of the engine in a way that will permit it to be secured at different angles of inclination in a vertical plane. The operating motor shown at 43 is preferably carried on this main supporting arm at such a point that the bearing 42 is intermediate the centers of gravity of the arm and motor, so that the motor will serve to counterbalance the weight of the main arm and its connected parts.

In employing a driving belt for operating the hand piece, it is preferable to provide means for preventing complete rotation of the several arms of the bracket in relation to each other, as this would cause twisting of the belt, the pulleys 31 on arm 27 being limited in their rotation about the arm 24 in the present instance by means of the device shown in Figs. 6 and 7, which is applied to the hinge member 25 by providing it with a tubular extension 44 having a segmental axial slot 45 therein to receive a correspondingly-shaped stop 46, the end of which projects somewhat beyond the tubular section 44. The lower end of the arm 24 is fitted into the hollow extension 44 of the hinge member 25 and is provided with a projection 47 which permits the arm 27 to swivel about the arm 24 in either direction until the projection 47 strikes the projecting portion of the stop 46, so that complete rotation between the arm 24 and the hinge member is prevented, although relative rotation between these parts is permitted through a considerable angle. A casing 48 is fitted over the coöperating portions of the arm 24 and the hinge member, being secured to the hinge member 25 by a screw 49, and having a shoulder 48ª abutting the projection 47 on arm 24 to prevent relative separation of the said arm and hinge member in an axial direction. A swivel connection as above described is preferably also provided between the hinge member 26 and the arm 27 for the purpose of permitting relative rotation through a limited angle between the pulleys 32 and 33 on the hand piece and the pulleys 31.

In order that the device may be handled with the greatest facility, it is preferable to provide a bracket or support 50 on the main supporting arm to receive and hold the arm 24 at an inclination from its normal vertical position and to provide a similar bracket 51 on the arm 24 to support the hand piece 28,— as this enables these parts to be folded up close to the main supporting arm and held out of the way of the operator, but within convenient reach so that they may be readily brought into operation at the proper moment. In carrying this into effect the bracket 50 should occupy a fixed relation relatively to the end of the arm 24, whether the extensible section of the main supporting arm is drawn out or not, and this is accomplished conveniently by providing a socket 53 for the double hook 50 on the same part which carries the pulley 9, and a similar hook 51 may be conveniently clamped at the proper point on the arm 24 by means of a set screw or other suitable device, so that the hook will be in position to receive the hand piece.

In manipulating a dental engine of the kind above described, the main supporting arm is preferably held rigidly at the proper angle of inclination in order that the arm 27 may rest substantially horizontal when the hand piece 29 is at the proper height relatively to the patient, the arm 24 normally hanging freely in a vertical position. As the hand piece is manipulated in various ways and shifted frequently from one position to another, the pivotal connections between the hand piece and the pendent arm 24 will cause the comparatively light arm 24 to be swung more or less out of its vertical position, so that the freedom with which this arm may swing permits the various movements of the hand piece to take place without the necessity of imparting motion to the main supporting arm of the engine, and as this pendent arm 24 is very light in construction, the inertia of the parts that must be moved at every change in the position of the hand piece is negligible, and consequently the movements of the hand piece will require but little effort. Frequently it becomes necessary to operate on patients while they are in a reclining position, and in such cases it is desirable to preserve the relation between the hand piece and the arms 24 and 27 and still bring these parts close to the altered position of the patient, and this may be accomplished by drawing out the extensible section of the main supporting arm, the arrangement of the pulleys 7 and 9 permitting the shortening and lengthening of the main supporting arm without disturbing the tension of the driving belt. The telescopic arrangement for the tubular and extensible members of the main supporting arm is preferably employed, as each part is guided relatively to the other and without looseness, as these parts are so fitted that sufficient friction is produced to hold the sections in relative adjusted positions, even against the tension of the driving belt, and the novel way of mounting the pulleys on the relatively stationary and extensible members prevents relative rotation either of the pulleys or the sections.

Ordinarily, as before stated, the freely-hanging arm 24 allows for all movements of the hand piece, as it is comparatively light in weight and operates as a freely-suspended pendulum to compensate for even the most delicate movements of the hand piece, but when the hand piece is moved a considerable degree in a direction transversely of the main supporting arm, the deflected pendent arm will cause the main arm to swing in a horizontal plane about the bearings 4 in order to take up a new position that will allow the pendent arm to resume a substantially vertical position, so that this comparatively light arm will at all times allow for the delicate movements of the hand piece such as take place during dental operations.

We claim as our invention:

1. In a dental engine, the combination with a supporting arm, of a freely swinging pendent arm suspended vertically from said supporting arm, a hand piece connecting arm, a device connecting one end of the latter with the lower end of the pendent arm and having means permitting the connecting arm to turn about an axis extending longitudinally of the pendent arm, a hand piece, and a connection between the free end of the connecting arm and the hand piece, having means permitting the latter to swing about an axis extending longitudinally of the connecting arm and also about an axis extending transversely of said connecting arm.

2. In a dental engine, the combination with a supporting arm, of a freely swinging pendent arm suspended in a substantially vertical plane from said supporting arm, a hand piece connecting arm, a device connecting one end of the latter to the lower end of the pendent arm and having means permitting the connecting arm to turn about an axis extending longitudinally of the pendent arm and also means permitting the connecting arm to turn about an axis extending transversely of said pendent arm and a hand piece having a depending arm pivotally attached to the connecting arm.

3. In a dental engine, the combination with a supporting arm mounted to swing in a horizontal plane, of a vertical arm suspended to swing freely from said supporting arm, a hand piece connecting arm, a device connecting the lower end of the vertical arm with one end of the connecting arm and having means permitting the connecting arm to turn about an axis extending longitudinally of the vertical arm, and also having means permitting the connecting arm to turn about an axis transverse to the longitudinal axis of the vertical arm, and a hand piece having a swivel connection with the said connecting arm for permitting relative rotation about the said arm as an axis, and also having a hinge connection therewith for permitting its relative adjustment about an axis transverse to the longitudinal axis of the connecting arm.

4. In a dental engine, the combination with a supporting arm, of an intermediate arm attached to the supporting arm, a hand piece connecting arm, a connection between one end of said connecting arm and one end of the intermediate arm permitting the connecting arm to swing about an axis extending longitudinally of the intermediate arm, and a hand piece articulated on the other extremity of the connecting arm, of pulleys arranged adjacent to the connected ends of the supporting, intermediate and connecting arms and on the hand piece, a belt passing over the said pulley, and a stop device for limiting the angle of relative rotation about the swivel joint between said intermediate and connecting arms.

5. In a dental engine, the combination with a supporting arm mounted to swing in a horizontal plane, of an intermediate arm, hinge members pivotally connecting it to the supporting arm, one of said members having a swivel connection with the supporting arm, a hand piece connecting arm, a connection between the connecting arm and the intermediate arm, having means permitting the connecting arm to swing about an axis extending longitudinally of the intermediate arm and also having means permitting the connecting arm to swing about an axis extending transversely of said intermediate arm, a hand piece articulated on the connecting arm, a driving belt, pulleys therefor carried by the supporting, intermediate and connecting arms and on the hand piece, and a stop device for limiting the relative rotary movement between the connecting and the intermediate arm.

6. In a dental engine, the combination with two arms thereof, and a hinge connection between them, of a sleeve on one of the arms having a segmental stop thereon, and a portion on the other arm adapted to rotatably fit in said sleeve having a projection thereon arranged to coöperate with said stop to limit the relative rotation between the two arms.

7. In a dental engine, the combination with a supporting arm, and a pair of hinged arms attached thereto, of a sleeve on one of the arms having a segmental axial slot therein, a stop resting in said slot having a portion projecting beyond the sleeve, the other arm having a portion rotatably fitted in said sleeve, a projection thereon arranged to coöperate with said stop to prevent complete rotation of said arm, and a casing secured to the sleeve and having a shoulder coöperating with said projection to prevent axial disengagement of the parts.

8. In a dental engine, the combination with a supporting arm embodying longitudinally adjustable sections, the outer section having a reversely turned end forming a journal bearing, offset from the arm and a pulley on each section of the arm, of a hinge member provided with a pivot pin journaled in said bearing, an adjustable arm having a hinge member coöperating with the first mentioned hinge member, and pulleys carried on the adjustable arm and arranged eccentrically to the hinge pivot, a hand piece attached to the free end of said adjustable arm, and a belt passing over the said pulleys and operatively connected to the hand piece.

9. In a dental engine, the combination with a supporting arm embodying longitudinally adjustable sections, the outer section having an offset portion, a hinge member mounted to turn on said offset portion about an axis parallel with the longitudinal axis of the supporting arm, an arm having a hinge member coöperating with the first mentioned hinge member, pulleys carried with one of said hinge members, a hand piece operatively connected to the arm, and a belt passing over the pulleys and operatively connected to the hand piece.

OSCAR H. PIEPER.
ALPHONSE F. PIEPER.

Witnesses:
CLARENCE A. BATEMAN,
RUSSELL B. GRIFFITH.